(12) United States Patent
Lu et al.

(10) Patent No.: US 7,829,606 B2
(45) Date of Patent: Nov. 9, 2010

(54) ACRYLIC HOT MELT ADHESIVES

(75) Inventors: Ming Chang Lu, Sang Chung (TW);
Peter D. Palasz, Maidenhead (GB)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/436,835

(22) Filed: May 7, 2009

(65) Prior Publication Data

US 2009/0272950 A1    Nov. 5, 2009

Related U.S. Application Data

(63) Continuation of application No. PCT/US2007/023274, filed on Nov. 5, 2007.

(60) Provisional application No. 60/857,296, filed on Nov. 7, 2006.

(51) Int. Cl.
  *C08F 2/50* (2006.01)
  *C08J 3/28* (2006.01)

(52) U.S. Cl. .......... 522/120; 522/35; 522/113; 522/114; 522/149; 522/119; 522/150; 522/153; 522/178; 522/182; 522/904; 428/343; 428/345; 428/356; 428/355 R; 526/319; 526/905; 526/222; 526/224; 526/309

(58) Field of Classification Search .......... 522/35, 522/113, 114, 120, 149, 119, 150, 153, 178, 522/182, 904; 428/343, 345, 355 R, 355 AC, 428/356; 426/222, 224, 309, 319, 905
See application file for complete search history.

(56) References Cited

U.S. PATENT DOCUMENTS

| | | | | |
|---|---|---|---|---|
| 4,144,157 | A * | 3/1979 | Guse et al. | 522/151 |
| 4,400,486 | A * | 8/1983 | Iwata et al. | 525/57 |
| 4,833,179 | A * | 5/1989 | Young et al. | 522/183 |
| 5,128,386 | A * | 7/1992 | Rehmer et al. | |
| 5,155,177 | A * | 10/1992 | Frihart | 525/420.5 |
| 5,384,341 | A * | 1/1995 | Itagaki et al. | 522/111 |
| 5,536,759 | A * | 7/1996 | Ramharack et al. | 522/35 |
| 5,574,117 | A * | 11/1996 | Yoshida et al. | 526/224 |
| 5,637,646 | A * | 6/1997 | Ellis | 525/309 |
| 5,741,829 | A * | 4/1998 | Reich et al. | 522/35 |
| 6,103,152 | A * | 8/2000 | Gehlsen et al. | 264/45.4 |
| 6,720,387 | B1 * | 4/2004 | Stark et al. | 525/203 |
| 6,720,399 | B2 * | 4/2004 | Husemann et al. | 526/319 |
| 6,753,079 | B2 * | 6/2004 | Husemann et al. | 428/355 AC |
| 6,765,078 | B2 * | 7/2004 | Husemann et al. | 526/319 |
| 6,800,688 | B2 * | 10/2004 | Usui et al. | 525/69 |
| 6,831,114 | B2 * | 12/2004 | Husemann et al. | 522/35 |
| 6,856,491 | B1 * | 2/2005 | Oveyssi | 360/265.2 |
| 7,084,185 | B2 * | 8/2006 | Husemann et al. | 522/149 |
| 2002/0193539 | A1 * | 12/2002 | Husemann et al. | 526/217 |
| 2003/0105258 | A1 | 6/2003 | Husemann et al. | |

* cited by examiner

*Primary Examiner*—Sanza L McClendon
(74) *Attorney, Agent, or Firm*—Sun Lee Lehmann

(57) ABSTRACT

High durable polarized film comprising a radiation curable PSA layer for lamination in TFT/LCD applications have high humidity and heat resistance. In one embodiment, the adhesive comprises a UV curable acrylic polymer, a compatible tackifier, a multifunction unsaturated oligomer, and a long chain alkyl acrylate monomer.

20 Claims, 1 Drawing Sheet

ACRYLIC HOT MELT ADHESIVES

CROSS-REFERENCE TO RELATED APPLICATIONS

This application is a continuation of Application No. PCT/US2007/023274 filed Nov. 5, 2007, which claims the benefit of Provisional Application No. 60/857,296 filed Nov. 7, 2006, the contents of each of which are incorporated herein by reference.

FIELD OF THE INVENTION

The invention relates to radiation curable hot melt compositions and to the use of such adhesives, in particular UV curable acrylic adhesives, to prepare laminated polarized films useful in the manufacture of LCD/TFT systems.

BACKGROUND OF THE INVENTION

Liquid crystal displays (LCDs) are commonplace, finding widespread use in applications such as laptop computers, calculators, digital watches and clocks, microwave oven displays, handheld games, and other end use applications. Such devices use liquid crystals because they react predictably to electric current in such a way to control light passage.

In the manufacture of LCDs, a liquid crystal material is sandwiched between two glass substrates, and a polarizing film is added to the outer side of each substrate. Currently, solution acrylic adhesives are used in the manufacture of polarized films assemblies or laminates. These adhesive limit production speed, and present other problems such as shrinkage.

There is a need in the art for other types of adhesives that can be used in the manufacture of polarized film laminates. In current invention addresses this need.

SUMMARY OF THE INVENTION

The invention provides radiation curable hot melt adhesive compositions and articles comprising a radiation cured hot melt adhesive.

One embodiment of the invention is directed to a radiation curable pressure sensitive adhesive comprising an acrylic polymer and a long chain alkyl acrylate monomer and, if desired or required, a compatible tackifying resin, a multi-functional unsaturated oligomer and/or a photoinitiator.

Another embodiment of the invention is directed to articles of manufacture comprising an adhesive that is permanently adhered to a substrate of the article and can be used to attach the substrate to a second substrate of the article, or to another article. Articles of the invention include tapes, labels, transfer films, and the like.

In one preferred embodiment, the article is a polarized film. It has surprising been found that UV curable adhesives can advantageously be used in the lamination of polarized films used in the assembly of LCD panels. Use of UV curable adhesives in the manufacture of polarized films provides films having high humidity and heat resistance. It has been discovered that polarized films having high heat and humidity resistance may be obtained using UV curable adhesives.

Still another embodiment of the invention is directed to articles comprising a polarized film wherein the polarized film comprises a UV curable acrylic adhesive. Encompassed are LCDs and articles comprising a LCD component.

Yet another embodiment of the invention is directed to a method of making a polarized film using a UV curable adhesive. In one preferred embodiment the adhesive comprises a UV curable acrylic polymer, a long chain (C6 or greater) alkyl acrylate monomer, a compatible tackifier, and a multifunctional acrylic monomer.

BRIEF DESCRIPTION OF THE DRAWING FIGURES

DETAILED DESCRIPTION OF THE INVENTION

Figure 1:
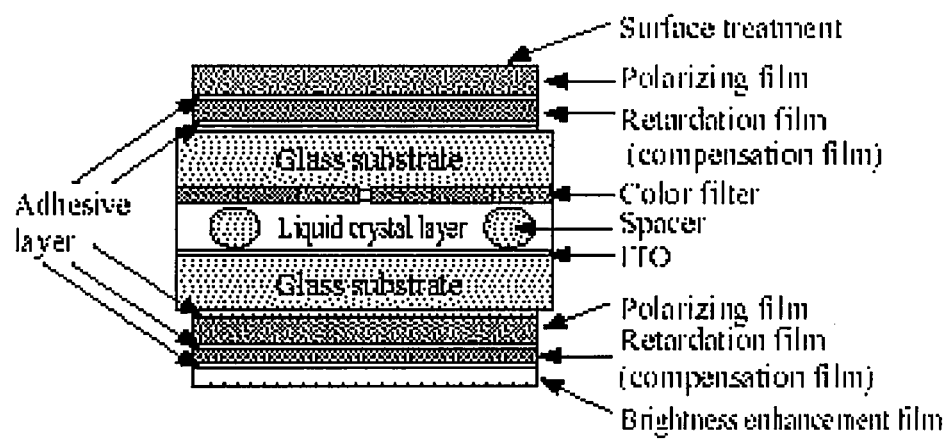
FIG. 1 is a general diagram showing locations of polarized films within a TFT/LCD panel.

It has now been discovered that adhesive compositions prepared using radiation curable acrylic polymers, in particular UV curable pressure sensitive hot melt pressure sensitive adhesive compositions, may advantageously be used to prepare polarized films of the type conventionally used in the manufacture of LCD devices.

The term "hot melt pressure-sensitive adhesive" or "hot melt pressure-sensitive adhesive composition" as used hereinafter means an adhesive or adhesive composition which, upon production of adhesive goods by applying an adhesive or adhesive composition to a base material such as paper, cloth or plastic film, is capable of forming a layer of the pressure-sensitive adhesive or pressure-sensitive adhesive composition on the base material by applying it to the base material as a hot-melt.

The term "pressure-sensitive adhesive" is used herein to refer to a viscoelastic material which adheres instantaneously to most substrates with the application of slight pressure and remains permanently tacky.

The term "tackifier" as used herein means any composition which is useful to impart tack to the hot melt adhesive composition or to increase the tack to a predetermined desired level, or to modify peel adhesion. ASTM D-1878-1T defines tack as "the property of a material which enables it to form a bond of measurable strength immediately on contact with another surface".

The term "radiation-curable adhesive" as used herein means an adhesive composition which is curable upon exposure to actinic and/or ionizing radiation. The term "radiation" is used herein to include actinic radiation such as ultraviolet radiation and ionizing radiation created by the emission of electrons or highly accelerated nuclear particles such as neutrons, alpha-particles etc.

Radiation curable adhesives useful in the practice of the invention will generally comprise, as a base resin, an acrylic polymer. Depending of the composition of the invention and intended cure, the composition may also comprise a photoinitiator and/or tackifier.

Examples of photoinitiators which may be used include one or more of the following: benzophenone, benzyldimethyl ketal, isopropylthioxanthone, bis(2,6-dimethoxybenzoyl)(2,4,4-trimethylpentyl) phosphineoxide, 2-hydroxy-2-methyl-1-phenyl-1-propanone, diphenyl(2,4,6-trimethylbenzoyl) phosphine oxides, 1-hydroxycyclohexyl phenyl ketone, 2-benzyl-2-(dimethylamino)-1-4-(4-morpholinyl)phenyl-1-butanone, alpha,alpha.-dimethoxy-alpha-phenylacetophenone, 2,2-diethoxyacetophenone, 2-methyl-1-4-(methylthio)phenyl-2-(4-morpholinyl)-1-propanone, 2-hydroxy-1-4-(hydroxyethoxy)phenyl-2-methyl-1-propanone.

One preferred radiation curable adhesive comprises, as base resin, an acrylic polymer. Mixtures or blends of acrylic polymers may be used in the practice of the invention. The acrylic polymer may, desirable, be bound to a photoreactive group (referred to herein as a UV curable acrylic polymer). A preferred UV curable acrylic polymer comprises an acrylic polymer backbone molecule that is modified with polymerized photoreactive groups, e.g., a modified benzophenone group that is chemically bonded to the acrylic polymer chain. The polymer is crosslinked by chemical grafting caused by the excitation of the photoinitiator by UV irradiation. The bound photoinitiator will typically be present in amounts of from about 0.1 to about 5 wt %, based on the wt of the acrylic polymer.

Particularly preferred UV acrylic copolymers comprise a C4 to C8 alkyl acrylate and has bonded to it a pendant benzophenone group. Such UV curable polymers are commercially available from BASF under the trade name acResin® UV. These materials are solvent- and water-free acrylic raw materials. These polymers are highly viscous liquids at room temperature and have to be heated to a temperature of about 120-130° C. to become fluid enough (viscosity ca. 40 Pa s) for the coating process on paper or plastic carriers. At this temperature, they can be applied to the backing substrate or carrier with conventional hot melt coating systems. Thus they are processed as hot melts. After being coated on the carrier, the polymer film is crosslinked by UV-irradiation to produce the adhesive properties required.

A particularly preferred UV acrylic copolymer comprises 2-ethylhexyl acrylate that has bonded to it a pendant benzophenone group. Such UV acrylic copolymers are commercially available from BASF under the trade names acResin® A 203 UV and acResin® A 204 UV. BASF's acResin® A 258 UV product, which comprises, as main component, butyl acrylate, may also be used in the practice of the invention, as can DS 3532 (poly ethylhexyl acrylate with bound photoinitiator). Other useful UV curable polymers include DS 3552X, also available commercially from BASF.

The adhesives of the invention will typically comprise from about 50 wt % up to about 95 wt % of the UV-curable polymer.

The adhesives of the invention will also comprise a long chain alkyl acrylate monomer. By long chain alkyl acrylate means an alkyl acrylate containing a C7 or greater alkyl group. Preferred are C6 to C30 alkyl acrylates, more typically C7 to C20 alkyl acrylates, and mixtures thereof. Nonlimiting examples of long chain alkyl acrylates that can be used in the practice of the invention include lauryl acrylate and isodecylate acrylate. Lauryl acrylate and isodecylate are commercially available, from Sartomer (e.g., SR 335 and SR 395, respectively) and Eternal Chemical Company (e.g., EM 215 and EM219, respectively).

The adhesives of the invention will typically comprise from about 1 wt % up to about 20 wt % of a long chain alkyl acrylate.

The adhesives of the invention may, if needed to for example modify peel adhesion, also comprise a compatible tackifier. By compatible tackifier is meant, as would be appreciated by the skilled artisan, a tackifier that is able to mix with adhesive polymer, e.g., acrylic polymer. In one preferred embodiment, the tackifier is a rosin based tackifier, and more specifically rosin esters and rosin acids and hydrogenated versions thereof. Examples include Foral 85 (Eastman), Pine Crystal KE 311 (Arakawa) and Staybelite Ester 10 (Hercules), as well as polyvinyl ethers, such as the Lutonal M40 grade from BASF. Other useful tackifiers include aliphatic and aromatic hydrocarbon resins, such as, for example, an alpha methyl styrene resin having a softening point of less than about 110° C. Examples include Kristalex 3085 (Kristalex F85), an alpha-methyl styrene resin having a softening point of about 85° C. which is commercially available from Eastman Chemical. Other useful tackifiers include Nikanol H, which is a commercially available xylene resin tackifier.

Levels of tackifiers is generally up to about 40 wt %, more typically from 0 to about 30 wt %.

In one particularly preferred embodiment the adhesive also comprises multifunctional unsaturated oligomers. Preferred are multifunctional acrylic monomers containing acrylate or methacrylate functionality, such as SR 295, available commercially from Sartomer and EM 241, available commercially from Eternal Chemical Company.

The adhesives of the invention will typically comprise from about 0 wt % up to about 15 wt % of a multifunction oligomer.

The compositions of the invention may include other additives known to those skilled in the art. These additives may include, but are not limited to, polyolefins, additional photoinitiators, pigments, fillers, fluorescent additives, flow and leveling additives, wetting agents, surfactants, antifoaming agents, rheology modifiers, stabilizers, and antioxidants.

In one embodiment, the adhesives of the invention may also include a polyolefin polymer. Such polymers include semicystalline or amorphous polyolefins and ethylene-containing polymers or copolymers as well as blends thereof. In one embodiment, the adhesive comprises at least one ethylene copolymer, and may comprise a blend of two or more polymers. The term ethylene copolymer, as used herein, refers to homopolymers, copolymers and ter- or multi-polymers of ethylene. Examples of ethylene copolymers include copolymers with one or more polar monomers which can copolymerize with ethylene, such as vinyl acetate or other vinyl esters of monocarboxylic acids, or acrylic or methacrylic acid or their esters with methanol, ethanol or other alcohols. Included are ethylene vinyl acetate, ethylene methyl acrylate, ethylene n-butyl acrylate, ethylene acrylic acid, ethylene methacrylate and mixtures and blends thereof. Other examples include but are not limited to polyethylene, ethylene/α-olefin interpolymers, poly-(butene-1-co-ethylene), atactic polypropylene, low density polyethylene, homogenous linear ethylene/α-olefin copolymers, ethylene n-butyl acrylate copolymers and ethylene vinyl ester copolymers). Random and block copolymers, as well as blends thereof may be used in the practice of the invention. Particularly useful are polyethylene/polypropylene Licocene copolymers (supplied by Clariant).

When used, polyolefins will typically be present in amounts of up to about 50 wt %, more typically from about 10 wt % up to about 30 wt %.

Antioxidants are typically added to protect ingredients against degradation during preparation and use of the adhesive compositions and to ensure long-term thermal stability without interfering with the irradiation curing of the polymer.

In general up to 3% by weight of one or more antioxidants is included in the adhesive compositions. Usually, 0 to about 3 wt %, more typically from about 0.1% to about 3% by, even more typically from about 0.4% by weight to about 2.0% by weight.

The UV curable polymer and other desired components such as functional monomer, tackifier, and antioxidant are blended together at a temperature of from about 130° C., but not more than 150° C., until a clear mixture is formed. Entrapped air may be removed by application of a vacuum.

Following coating of the composition onto a carrier or release liner such as paper, silicone or foil, it is subjected to UV irradiation. Under the action of UV light, the photoreactive groups in the UV curable polymer crosslink the polymer backbone.

Conventional H bulbs and medium pressure mercury-vapor lamps which emit UV wavelengths can be used in the practice of the invention to cure the adhesives of the invention.

The pressure sensitive adhesives of the invention may advantageously be used to prepare polarizing films used in the manufacture of LCDs. The structure and function of LCDs are well know and understood to skilled practitioners and, as such, will not be explained herein in any detail. The general, however, LCDs have the general configuration shown in FIG. 1. Active LCDs depend on thin film transistors (TFT) arranged in a matrix on a glass substrate.

With reference to FIG. 1, a light source is located directly behind the LCD. From this source, the light ray will pass through a light polarizer to uniformity polarize the light so it can be acted upon by the liquid crystal matrix. The light beam will then pass through the LC matrix (ex: TFT), which will determine whether this pixel should be "on" or "off". If the pixel is "on", the liquid crystal cell is electrically activated, and the molecules in the liquid will align in a single direction. This will allow the light to pass through unchanged. If the pixel is "off", the electric field is removed from the liquid, and the molecules within scatter. This dramatically reduces the light that will pass through the display at that pixel.

In a color display, after the light passes through the liquid crystal matrix, it passes through a color filter (usually glass). This filter blocks all wavelengths of light except those within the range of that pixel. In a typical RGB display, the color filter is integrated into the upper glass colored microscopically to render each individual pixel either red, green or blue. After a beam of light passes through the color filter, it passes through yet another polarizer to sharpen the image and eliminate glare. The image is then available for viewing.

Figure 2:
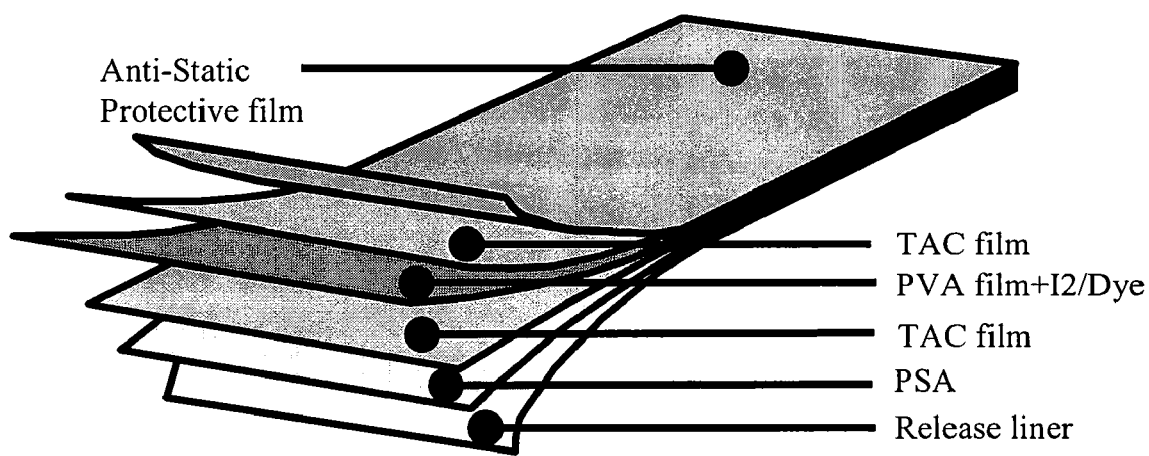
FIG. 2 is an exploded diagram of a polarized film.

Polarizers of the type used in LCD/TFT displays are multicomponent film assemblies having the general structure shown in FIG. 2. Typical layers include poly vinyl acetate (PVA) films, triacetyl cellulose (TAC) films and an antistatic protective film layer, a pressure sensitive adhesive (PSA) and a release liner. In the manufacture of a polarized films in accordance with the invention a UV curable pressure sensitive adhesive is used as the PSA layer and will typically be applied to a release liner, cured and then applied to the film assembly. Following removal of the release liner the polarized film may be incorporated into a LCD. The UV curable adhesive will typically applied at a coat weight of 5 gsm to about 60 gsm.

In addition to coating the adhesive as a melt, the adhesive may, if desired, be dissolved in an organic solvent such as ethyl acetate and applied in the form of a solution of a UV curable adhesive.

It has been discovered that highly durable polarized films may be prepared using UV acrylic polymers. Particularly preferred for use in the manufacture of polarized films are UV curable adhesive films that comprise a long chain alkyl (C6 or greater) acrylic monomer, and may also desirable contain a compatible tackifier and a multifunctional acrylic monomer. Using the adhesives described herein, films having a clear appearance needed for optical grade applications, having a peel strength for glass of less than 1,000 g/in, and having excellent humidity and heat performance may be obtained.

The invention will be described further in the following examples, which are included for purposes of illustration and are not intended, in any way, to be limiting of the scope of the invention.

EXAMPLES

In the following examples the test methods used were performed as follows.

Films comprising an adhesive (20 μm±2 μm coating weight) were cured using UV-C light source with 50 mj/square meter dose.

Glass peel strength data was measured using a tensile machine with 300 mm/min tensile speed and 180° peel direction.

The high humidity and heat resistance performance of adhesives where tested after 500 hours at 65% RH/65° C. and 85% RH/85° C., 500 hours test.

The following components were used to prepare the exemplified adhesive:

acResin® A 204, 2-ethylhexyl acrylate containing polymer having a bound benzphenone group, BASF.

Lauryl acrylate, SR-335, Sartomer.

Isodecyl acrylate, SR-395, Sartomer.

Pentaerythritol tetraacrylate (a multifunctional monomer), SR-295, Sartomer.

Aliphatic urethane acrylate diluted in 15% EOEOEA, 6148J-75, Eternal Chemical Co.

Aliphatic urethane acrylate diluted in 15% HDDA, 611B-85, Eternal Chemical Co.

Irgacure 819, a bis acyl phosphine photoinitiator, Ciba Specialty Chemicals.

Kristalex 3085, hydrocarbon rosin, Eastman Chemical Co.

Foral 85, hydrogenated rosin, Eastman Chemical Co.

Example 1

Adhesive formulations were prepared and performance properties results record. Composition and performance is shown in Table 1.

TABLE 1

| parts by weight | 1 | 2 | 3 | 4 | 5 | 6 | 7 | 8 |
|---|---|---|---|---|---|---|---|---|
| A204 | 75 | 75 | 75 | 75 | 75 | 75 | 75 | 75 |
| Aliphatic urethane acrylate diluted in 15% EOEOEA | 10 | 10 | | | | | | |
| Aliphatic urethane diacrylate diluted in 15% HDDA | | | 10 | 10 | | | | |
| Lauryl acrylate | | | | | 5 | 10 | | |
| Isodecyl acrylate | | | | | | | 5 | 10 |
| SR 295 | 5 | 5 | 5 | 5 | 5 | 5 | 5 | 5 |
| Kristalex 3085 | 10 | | 10 | | 15 | 12 | | |
| Foral 85 | | 10 | | 10 | | | 15 | 12 |
| Igacure 819 | 1 | 1 | 1 | 1 | 1 | 1 | 1 | 1 |

TABLE 1-continued

| parts by weight | 1 | 2 | 3 | 4 | 5 | 6 | 7 | 8 |
|---|---|---|---|---|---|---|---|---|
| Humidity and heat resistance (passed (P)/failed (F)) | F at RH 95% 65° C. | F at RH 95% 65° C. | F at RH 95% 65° C. | F at H 95% 65° C. | P RH 95% 85° C. 500 hrs | P RH 95% 85° C. 500 hrs | P RH 95% 85° C. 500 hrs | P RH 95% 85° C. 500 hrs |
| Peel strength gf/inch glass | 600 | 800 | 700 | 900 | 400 | 600 | 550 | 900 |

F = failed
P = passed

The invention claimed is:

1. A radiation curable hot melt adhesive composition comprising an acrylic polymer and a long chain alkyl acrylate monomer.

2. The composition of claim 1 further comprising a compatible tackifier.

3. The composition of claim 1 wherein said alkyl acrylate monomer is selected from the group consisting of lauryl acrylate, isodecylate acrylate and mixtures thereof.

4. The composition of claim 1 comprising a photoinitiator.

5. The composition of claim 4 wherein the photoinitiator is bound to said acrylic polymer.

6. The composition of claim 5 wherein the acrylic polymer comprises a C4 to C8 alkyl acrylate.

7. The composition of claim 6 wherein the UV curable acrylic polymer comprises 2-ethylhexyl acrylate.

8. The composition of claim 7 wherein the photoinitiator comprises a benzophenone group.

9. The composition of claim 1 further comprising a multifunctional unsaturated oligomer.

10. The composition of claim 5 comprising 1 to 20 wt % alkyl acrylate monomer, 0 to 30 wt % of a compatible tackifier, 0 to 15 wt % of a multifunctional unsaturated oligomer, 0 to 2 wt % of added photoinitiator and 0 to 2% of a stabilizer.

11. The composition of claim 1 which has been cured by UV irradiation.

12. An article of manufacture comprising the cured hot melt adhesive composition of claim 11.

13. A polarized film comprising a UV cured pressure sensitive adhesive composition.

14. The polarized film of claim 13 wherein the adhesive composition was prepared by curing a composition comprising a UV curable acrylic polymer and a long chain alkyl acrylate monomer.

15. The polarized film of claim 14 wherein the composition further comprises a compatible tackifier and a multifunctional unsaturated oligomer.

16. The polarized film of claim 15 wherein the composition comprises a hydrogenated rosin ester tackifier having a softening point of about 105° C.

17. The polarized film of claim 16 wherein the composition comprises an alkyl acrylate monomer selected from the group consisting of lauryl acrylate, isodecylate acrylate and mixtures thereof.

18. The polarized film of claim 17 further comprising a release liner.

19. The polarized film of claim 13 wherein the adhesive is applied as a melt.

20. The polarized film of claim 13 wherein the adhesive is applied in the form of a solution.

* * * * *